United States Patent [19]

Mikata

[11] 4,117,921

[45] Oct. 3, 1978

[54] TRAY LOADING DEVICE IN CONTINUOUS CONVEYING AND PROCESSING SYSTEM

[75] Inventor: Yoshitaka Mikata, Himeji, Japan

[73] Assignee: Yamato Scale Company, Ltd., Japan

[21] Appl. No.: 766,529

[22] Filed: Feb. 7, 1977

[30] Foreign Application Priority Data

Feb. 10, 1976 [JP] Japan ............................ 51/14224[U]

[51] Int. Cl.² ...................... B65G 47/02; B65G 47/34
[52] U.S. Cl. .................................... 198/482; 198/653; 198/796
[58] Field of Search ............... 198/339, 342, 482, 483, 198/646, 653–655, 704, 793, 796

[56] References Cited

U.S. PATENT DOCUMENTS

| 1,935,409 | 11/1933 | Mudd | 198/482 |
|---|---|---|---|
| 2,496,516 | 2/1950 | Bellato | 198/653 |
| 2,804,027 | 8/1957 | Hecht | 198/482 |
| 3,191,750 | 6/1965 | Lewis | 198/482 |
| 3,318,435 | 5/1967 | Scott | 198/646 |
| 3,718,267 | 2/1973 | Hiebert et al. | 198/796 |
| 3,770,104 | 11/1973 | Reimers | 198/655 |
| 3,814,234 | 6/1974 | Santen | 198/704 |
| 3,868,897 | 3/1975 | Moreau | 198/704 |
| 3,895,707 | 7/1975 | Anikanov et al. | 198/654 |
| 4,015,704 | 4/1977 | Warren | 198/655 |

Primary Examiner—Evon C. Blunk
Assistant Examiner—Richard K. Thomson
Attorney, Agent, or Firm—Eugene E. Geoffrey, Jr.

[57] ABSTRACT

A continuous processing system for loading trays containing materials to be processed on carriages carried by a conveyor for processing said materials, the carriages have a removable cover or lid with at least one side open and the tray feeding device is synchronized with intermittent motion of the carriage conveyer and aligns the tray or stacks of trays with each carriage and automatically opens and closes the cover or lid of each carriage during the period of intermittent motion to permit insertion of a tray or stack or trays.

2 Claims, 8 Drawing Figures

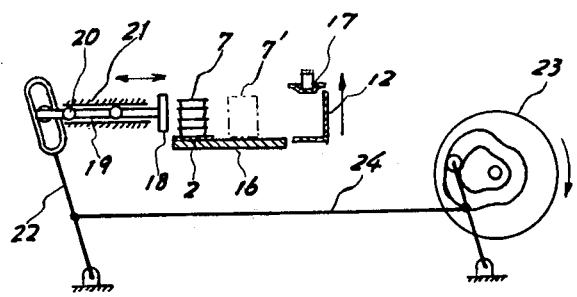
FIG. 4
FIG. 5
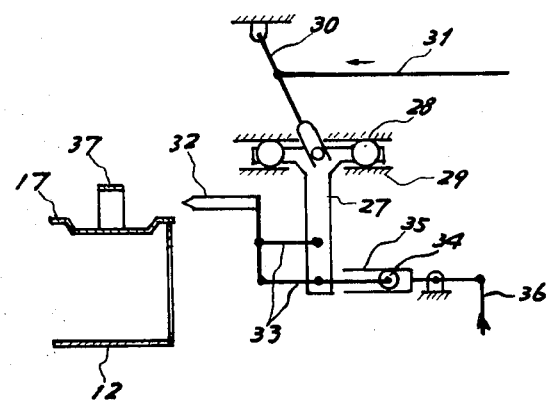
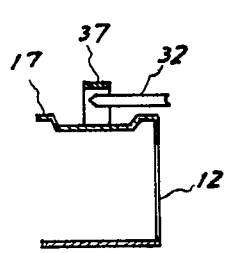
FIG. 6
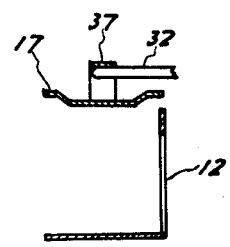
FIG. 7
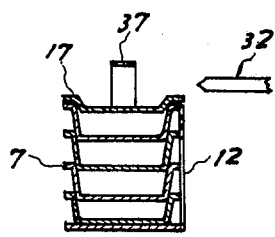
FIG. 8

TRAY LOADING DEVICE IN CONTINUOUS CONVEYING AND PROCESSING SYSTEM

This invention relates to a continuous processing system in which a plurality of carriages having a cover or lid each are conveyed by an endless chain, for example, and one or more trays containing materials to be processed are carried in each carriage for the purpose of treating the materials during the conveyance. More specifically, this invention relates to a tray loading mechanism used in this system for successively loading the trays in the covered carriages.

Although many types of continuous processing systems in which a plurality of trays containing materials to be processed are conveyed continuously by a conveyer and various treatments such as sterilization, cooking and smoking of foods are performed on the materials during the conveyance have been used previously, there has not been any system provided with a mechanism for loading the trays in a carriage having a cover or lid in automatic fashion.

According, an object of this invention is to provide a continuous processing system in which trays containing materials to be processed can be loaded automatically in each carriage having a cover or lid.

According to this invention, the continuous processing system comprises a treating device for treating materials to be treated, an endless conveyor passing through said treating device, a plurality of carriages attached to said conveyor at constant intervals, a tray loading device disposed at the entrance of said treating device and a tray feeding device for feeding trays or tray stacks containing said materials to said tray loading device at constant intervals. Each carriage has a removable cover or lid and at least one side opened. The endless conveyer and the tray feeding device are arranged to perform synchronized intermittent motion and align each tray or tray stack and each carriage at a loading position during the rest period of the motion, and the tray loading device comprises means for opening and closing the cover or lid of each carriage during said rest period and means for pushing the tray or tray stack into each carriage through its open side from the tray feeding device while the cover is opened.

The features and operation of the system of this invention will be described in more detail hereinunder with reference to the accompany drawings.

In the drawings

FIG. 4 is a schematic sectional side view taken along the line IV—IV of FIG. 3;

FIG. 5 is a schematic sectional side view representing an embodiment of a cover control mechanism used in the system of this invention; and FIGS. 6 through 8 are schematic sectional side views illustrating the cover control operation of the mechanism of FIG. 5.

Throughout the drawings, like reference numerals are used to denote like structural components.

Figure 1:
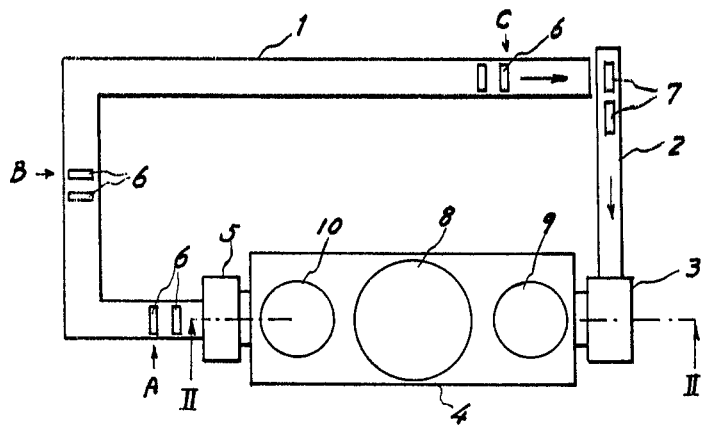
FIG. 1 is a schematic plan view of a continuous sterilizing system in which the present invention is preferably embodied.

Referring first to FIG. 1, the continuous sterilizing system includes a tray returning conveyer 1, a tray feeding conveyer 2, a tray loading device 3, a sterilizing device 4 and a tray unloading device 5. In this system, the treated materials are unloaded from trays 6 at position A, the new materials to be treated are loaded on the trays 6 at position B and the trays 6 are piled up as predetermined stacks at position C as occasion demands. The description will be made in conjunction with the case in which a predetermined number of trays 6 are piled up at the position C and fed by the feeding conveyer 2 to the tray loading device 3 successively as tray stacks 7.

Figure 2:
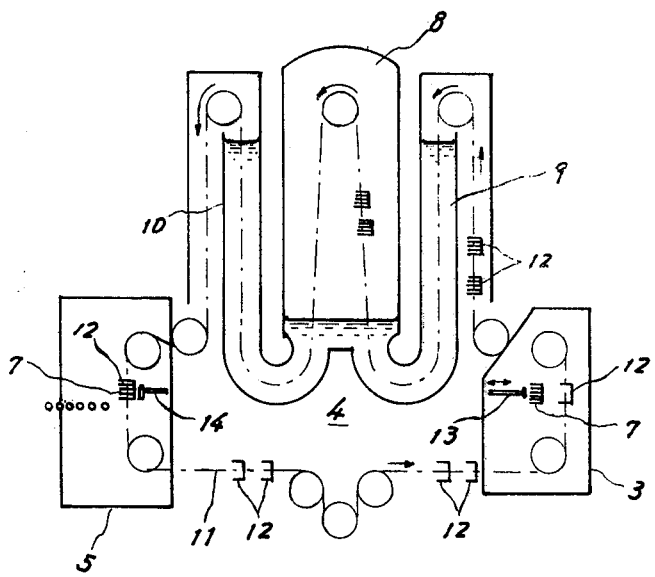
FIG. 2 is a schematic sectional elevation view, taken along the line II—II of FIG. 1, illustrating a general configuration of the system of this invention.

Referring next to FIG. 2, the sterilizing device 4 includes a sterilizing chamber 8 and a pair of hydrolocking devices 9 and 10 for conserving the pressure in the chamber 8 and an endless chain conveyer 11 extends through the tray loading device 3, the sterilizing device 4 and the tray unloading device 5. The chain conveyer 11 carries a plurality of carriages 12 at constant intervals. The tray stacks 7 are loaded respectively on the carriages 12 by a loading mechanism 13 in the tray loading device 3, conveyed through the sterilizing device 4 for sterilization of the contents of the trays and then unloaded by an unloading mechanism 14 in the tray unloading device 5. In the system of this invention, each carriage 12, a removable cover 17 and at least one side opened and the tray feeding conveyer 2 and the chain conveyer 11 are arranged to perform synchronized intermittent motion, as described later.

Figure 3:
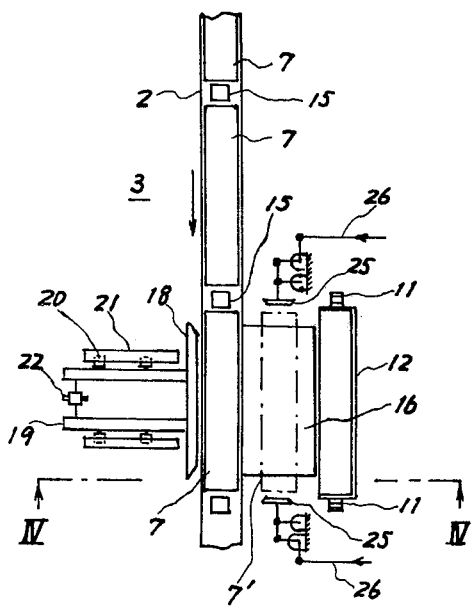
FIG. 3 is a schematic plan view representing an embodiment of a tray loading mechanism used in the system of this invention.

In FIGS. 3 and 4, the tray stacks 7 which are placed on the feeding conveyer 2 are intermittently fed in the direction of the arrow by the aid of feeding rails 15 and come to a temporary stop when each one reaches a loading board 16 in the loading position as shown. At the same time, each carriage 12 of the chain conveyer 11 is also driven intermittently in synchronism with the feeding conveyer 2 and comes to a temporary stop at the loading position. During this rest period of the intermittent motion, the tray stack 7 is aligned with the carriage 12 and faces the open side of the carriage 12.

In the loading position, opposing the carriage 12 with respect to the tray stack 7, there is a tray pushing member 18 supported by a pair of supporting bars 19 which are provided with rollers 20 rolling in a pair of guide rails 21. The pushing member 18 is arranged to make a reciprocal motion in the direction of the arrow (FIG. 4) by means of a swinging arm 22 which is driven by a cammed wheel 23 through a link 24. As readily understood, the tray stack 7 is pushed by the pushing member 17 through an intermediate position 7' into the carriage 12. In the intermediate position 7', provided are a pair of tray positioning members 25 driven by links 26 to push the tray stack 7' from the both sides so that the tray stack 7' can be loaded smoothly in the carriage 12.

As each carriage 12 has a cover 17, the cover 17 must be taken off before the tray stack 7 is loaded and then put on after it is loaded. The cover control mechanism for performing this operation will be described with reference to FIGS. 5 through 8.

The cover control mechanism includes a slide member 27 having rollers 28 rolling in a horizontal guide rail 29 and being driven by a swinging arm 30 which is coupled through a connecting rod 31 to a suitable cammed driving wheel (not shown). A finger bar 32 is supported horizontally on the slide member 27 through a parallelogramic linkage 33. At the free end of one link of the linkage 33, there is pivoted a roller 34 rolling in a fork member 35 which swings vertically by means of a connecting rod 36 coupled to a suitable driving means (not shown). Thus, the horizontal finger bar 32 is moved horizontally by the horizontal swing of the arm 30 and vertically by the vertical swing of the fork member 34.

When the carriage 12 and the tray stack 7 come to a temporary stop at the loading position as shown in FIGS. 3 and 4, the finger bar 32 is moved to the left to come under a hook 37 of the cover 17 of the carriage 12 as shown in FIG. 6. Then, the connecting rod 36 is moved upwardly to cause a downward swing of the fork member 35 and, accordingly, the finger bar 32 is lifted upwardly by the linkage 33, thereby lifting the cover 17 of the carriage 12 as shown in FIG. 7. In this condition, the tray stack 7 is loaded in the carriage 12 by means of the tray pushing mechanism as above mentioned. After the tray stack is loaded, the finger bar 32 is moved inversely along the same path to put the cover 17 on the carriage 12 and, then returns to the original position, as shown in FIG. 8.

When the above operation is completed, the feeding conveyer 2 and the chain conveyer 11 initiates their motions and transfers the next tray stack and carriage to the loading position. The above operation is repeated and the tray stacks 7 fed by the tray feeding conveyer 2 are successively loaded on the carriages 12 of the sterilizing device 4.

It is desirable to shape the cover 17 of the carriage 12 such that the cover 17 can catch not only the carriage 12 but also the tray stack 7, as shown in FIG. 8, so as to prevent the tray stack 7 from slipping off out of the carriage 12 when the carriage 12 is accidentally tipped up.

It should be noted that the above description was made in connection with only an embodiment of the invention and there may be various modifications and changes available without departing from the scope of the invention as defined by the appended claims. For example, the tray loading device 3 may be controlled electromagnetically or pneumatically though it is controlled mechanically in the above embodiment.

Moreover, it is understood that a similar mechanism can be used in the tray unloading device 5 when the other side of the carriage 12 is also opened as shown in FIGS 5 and 8.

What is claimed is:

1. A continuous processing system comprising a material treating device for treating materials carried in trays, an endless conveyor passing through said treating device and having a plurality of uniformly spaced tray receiving carriages, a horizontally disposed tray loading station at one position along said conveyor and a horizontally disposed tray unloading station at another position along said conveyor, each of said carriages having tray receiving means with an open side for reception of a tray or stack of interengaged trays and an elevatable cover having means positively interlocking said tray or stack of trays to retain them in position on the tray receiving means during movement by said endless conveyor, means for intermittently driving said conveyor and causing said carriages to pause at the loading and unloading stations, means at said loading station for raising said elevatable cover while maintaining it in a horizontal position, loading said tray or stack of trays onto said carriage and lowering said cover while maintaining in said horizontal positon to engage said tray or stack of trays during the pause in said motion and means at said unloading station for elevating said cover while maintaining it in a horizontal position and removing said trays.

2. A continuous processing system according to claim 1 wherein said raising means includes a horizontal finger bar, means on said cover for engaging said finger bar, a parallel linkage supporting said finger bar and means for shifting the parallel linkage toward said cover to cause said bar to engage said cover and then actuating said linkage to move said bar upwardly while maintaining its horizontal position to raise said cover horizontally.

* * * * *